United States Patent [19]

Kamikado et al.

[11] Patent Number: 5,126,413
[45] Date of Patent: Jun. 30, 1992

[54] ADDITION PRODUCT OF LACTONE-MODIFIED EPOXY RESIN WITH POLYPHENOL AND AMINO COMPOUNDS

[75] Inventors: Koji Kamikado, Yokohama; Haruo Nagaoka, Hiratsuka, both of Japan

[73] Assignee: Kansai Paint Co., Ltd., Kanagawa, Japan

[21] Appl. No.: 609,068

[22] Filed: Nov. 1, 1990

Related U.S. Application Data

[63] Continuation of Ser. No. 327,119, Mar. 22, 1989, abandoned.

[30] Foreign Application Priority Data

Sep. 29, 1988 [JP] Japan .................. 63-242592

[51] Int. Cl.$^5$ ................. C08G 59/16; C08L 63/02
[52] U.S. Cl. ...................... 525/528; 525/533
[58] Field of Search .................. 525/533, 528

[56] References Cited

U.S. PATENT DOCUMENTS

| | | | |
|---|---|---|---|
| 4,522,984 | 6/1985 | Watanabe et al. | 525/533 |
| 4,804,718 | 2/1989 | Dervan et al. | 525/533 |
| 4,829,105 | 5/1989 | Yamada et al. | 525/533 |

FOREIGN PATENT DOCUMENTS

| | | | |
|---|---|---|---|
| 60-186524 | 9/1985 | Japan | 525/533 |
| 63-179918 | 7/1988 | Japan | 525/533 |

*Primary Examiner*—Robert E. Sellers
*Attorney, Agent, or Firm*—Wenderoth, Lind & Ponack

[57] ABSTRACT

A coating resin composition comprising, as a main component, an amino group-containing, modified epoxy resin derivative obtained by subjecting a hydroxyl group-containing epoxy resin having epoxy equivalent of 200–400 and a cyclic ester compound represented by the general formula (I)

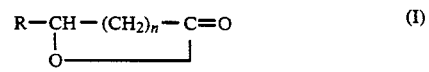

(R is a hydrogen atom or a methyl group and n is 3–6) to an addition reaction to obtain an addition product and then adding to the addition product a polyphenol compound and an amino group-containing compound.

16 Claims, No Drawings

ADDITION PRODUCT OF LACTONE-MODIFIED EPOXY RESIN WITH POLYPHENOL AND AMINO COMPOUNDS

This application is a continuation of now abandoned application Ser. No. 327,119 filed Mar. 22, 1989.

The present invention relates to a novel coating resin composition, more particularly to a coating resin composition which is superior in thick layer coatability (desired in cationic electrocoating), weatherability, corrosion resistance, flexibility, adhesion to substrate, etc.

As cationic electrocoating resin composition, there has generally been known a resin composition which is a combination of (a) an epoxy-polyamine resin obtained by the reaction of an epoxy group-containing resin with a polyamine and (b) a blocked polyisocyanate curing agent, as described in, for example, U.S. Pat. No. 3947339. As the above epoxy group-containing resin, there is ordinarily used, in view of the corrosion resistance of the final resin composition, a polymer of bisphenol A and there is practically used a modified epoxy resin obtained by partially introducing into an epoxy resin a plasticity-modifying agent such as soft polyester, polyether, polyamide, polybutadiene, butadiene-acrylonitrile copolymer or the like to allow the epoxy resin to have plasticity.

Recently, in the field of electrocoating for automobile body or underparts of body, there has been a strong request to develop an electrocoating paint having high-build coatability and capable of forming a cured coating film superior in weatherability, corrosion resistance, flexibility, adhesion to substrate, etc. in view of film appearance and properties.

In connection with the above request, when in the above mentioned modified epoxy resin, the amount of the plasticity-modifying agent is increased in order to endow the epoxy resin with the thick layer coatability required in cationic electrocoating, there is introduced into the epoxy resin a portion with low weatherability and corrosion resistance and accordingly the resulting modified epoxy resin had no sufficient weatherability and corrosion resistance; meanwhile when the amount of the plasticity-modifying agent is decreased in order to fortify the weatherability and corrosion resistance, no high-build coatability is obtained.

A major object of the present invention is to provide a coating resin composition having high-build coatability and further having weatherability, corrosion resistance, flexibility, adhesion to substrate, etc. in good balance.

Another object of the present invention is to provide a cationic electrocoating resin composition having such properties.

Other objects and advantages of the present invention will become apparent from the following description.

According to the present invention there is provided a coating resin composition comprising, as a main component, an amino group-containing, modified epoxy resin derivative obtained by subjecting a hydroxyl group-containing epoxy resin having an epoxy equivalent of 200-400 and a cyclic ester compound represented by the general formula (I)

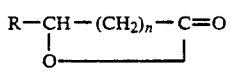

(R is a hydrogen atom or a methyl group and n is 3-6) to an addition reaction to obtain an addition product and then adding to the addition product a polyphenol compound and an amino group-containing compound.

The amino group-containing, modified epoxy resin derivative of the present invention has high-build coatability and is superior in weatherability, corrosion resistance and flexibility. This is thought to be because the amino group-containing, modified epoxy resin derivative has a structure having a highly reactive primary hydroxyl group at the side chain, which has been obtained by introducing into a hydroxyl group-containing epoxy resin a cyclic ester compound of high plasticizing ability in a ring-opening state.

The coating resin composition of the present invention is described in more detail below.

The amino group-containing, modified epoxy resin derivative is obtained by subjecting a hydroxyl group-containing epoxy resin of certain type and a cyclic ester compound represented by the general formula (I) to an addition reaction to obtain an addition product and then adding to the addition product a polyphenol compound and an amino group-containing compound.

The hydroxyl group-containing epoxy resin used in the production of the above amino group-containing, modified epoxy resin derivative is a compound having, on an average, hydroxyl groups of at least 0.5, preferably 0.7 to less than 2, more preferably 0.8 to 1.5 per molecule and epoxy groups of 2 or more, preferably 2 to 3 per molecule. There is particularly preferred a polyepoxy compound having 2 epoxy groups per molecule. The epoxy resin has an epoxy equivalent of 200-400, preferably 220-350, more preferably 230-280 and has a molecular weight of ordinarily about 400 to about 1,000, preferably about 400 to about 700, more preferably about 450 to about 600. Particularly useful polyepoxy compounds include a polyglycidyl ether of a polyphenol such as bisphenol A. As typical examples of such a polyepoxy compound, there can be mentioned glycidyl ethers of polyphenols such as bis(4-hydroxyphenyl)-2,2-propane, bis(4-hydroxyphenyl)-1,1-ethane, bis(4-hydroxyphenyl)-methane, 4,4'-dihydroxydiphenylsulfone, phenolic novolak, cresol novolak and the like, as well as their polymers.

In the present invention, the hydroxyl group-containing epoxy resin is subjected to an addition reaction with the cyclic ester compound represented by the general formula (I). This addition reaction can be effected according to a per se known method. It can be effected, for example, by heating the hydroxyl group-containing epoxy resin and the cyclic ester compound at a temperature of about 100° C. to about 250° C. for about 1 hour to about 15 hours in the presence of a metal compound as a catalyst such as titanium compound (e.g. tetrabutoxytitanium, tetrepropoxytitanium), organotin compound (e.g. tin octylate, dibutyltin oxide, dibutyltin laurate), stannous chloride and the like. It is convenient that the catalyst be generally used in an amount of 0.5–1,000 ppm based on the total amount of the hydroxyl group-containing epoxy resin and the cyclic ester compound.

The cyclic ester compound is represented by the general formula (I)

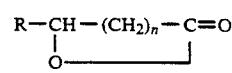

(R is a hydrogen atom or a methyl group and n is 3-6). As the cyclic ester compound, there can be mentioned, for example, δ-valerolactone, ε-caprolactone, ξ-enantholactone, η-caprylolactone, γ-valerolactone, δ-caprolactone, ε-enantholactone and ξ-caprylolactone. Particularly preferred are those cyclic ester compounds (lactones) of the general formula wherein n is 4-6 and R is a hydrogen atom (i.e. 6-8 carbon atoms).

In the addition reaction between the hydroxyl group-containing epoxy resin and the cyclic ester compound of the formula (I), the cyclic ester compound causes ring opening and reacts with the secondary hydroxyl group in the epoxy resin to produce a primary hydroxyl group and at the same time the methylene chain portion of the lactone endows the epoxy resin with flexibility, high-build coatability and weatherability The amount of the cyclic ester compound of the formula (I) to be reacted with the epoxy resin has no strict restriction but it is generally preferable that the cyclic ester compound be used so that the final reaction product of the present invention, i.e. the amino group-containing, modified epoxy resin derivative contains a portion based on the cyclic ester compound in an amount of 5-50% by weight, preferably 10-40% by weight, more preferably 15-35% by weight.

In the present invention, to the addition reaction product (hereinafter referred to as "lactone-modified epoxy resin") between the hydroxyl group-containing epoxy resin and the cyclic ester compound are further added a polyphenol compound and an amino group-containing compound to obtain an amino group-containing, modified epoxy resin derivative. The order of the addition reaction of the lactone-modified epoxy resin with the polyphenol compound or the amino group-containing compound has no restriction. It is possible to first conduct the reaction with the polyphenol compound, or to conduct, prior to that reaction, the reaction with the amino group-containing compound, or to simultaneously conduct the reaction with the polyphenol compound and the reaction with the amino group-containing compound.

When the amino group-containing, modified epoxy resin derivative is desired to have a narrow molecular weight distribution, it is advantageous that the polyphenol compound is added to the lactone-modified epoxy resin and then the amino group-containing compound is reacted.

The polyphenol compound used in the present invention includes, for example, bis(4-hydroxyphenyl)-2,2-propane, bis(4-hydroxyphenyl)-1,1-ethane, bis(4-hydroxyphenyl)-1,1-isobutane, 4,4'-dihydroxybenzophenone, bis(4-hydroxy-3-t-butylphenyl)-2,2-propane, bis(2-hydroxynaphthyl)methane, 1,5-dihydroxynaphthalene, etc.

The reaction of the polyphenol compound with the lactone-modified epoxy resin or with the addition product between the lactone-modified epoxy resin and the amino group-containing compound can be effected according to a per se known method. It can be effected, for example, by heating (a) the polyphenol compound and (b) the lactone-modified epoxy resin or the addition product between the lactone-modified epoxy resin and the amino group-containing compound at a temperature of about 50° C. to about 200° C. for about 1 hour to about 15 hours in the presence of 1-2,000 ppm, based on the total amount of (a) and (b), of a catalyst such as a basic tertiary amino compound (e.g. dimethylbenzylamine, tributylamine, triethylamine).

By this reaction, the polyphenol compound is added to and introduced into the lactone-modified epoxy resin or the addition product having epoxy groups between the lactone-modified epoxy resin and the amino group-containing compound, whereby a secondary hydroxyl group contributing to adhesitivity can be formed in the resulting product.

In the above reaction, the amount of the polyphenol compound used is not restricted strictly, but it is advisable that the amount be generally 0.2-0.9 mole, preferably 0.35-0.80 mole, more preferably 0.5-0.75 mole per mole of the lactone-modified epoxy resin or the addition product between the lactone-modified epoxy resin and the amino group-containing compound.

As the amino group-containing compound which can be reacted with the lactone-modified epoxy resin or with the addition product between the lactone-modified epoxy resin and the polyphenol compound, there can be mentioned, for example, aliphatic, alicyclic or aromatic-aliphatic primary or secondary amines (these compounds form amino groups by reacting with the epoxy group of the epoxy resin), as well as tertiary aminomonoisocyanates obtained by the reaction between a tertiary aminoalcohol and diisocyanate (these isocyanates can introduce amino group into the epoxy resin by reacting with the hydroxyl group of the epoxy resin).

As examples of the primary or secondary amines, there can be mentioned the followings.

(1) Primary monoamines such as alkylamine (e.g. methylamine, ethylamine, n- or iso-propylamine) and monoalkanolamine (e.g. monoethanolamine, n- or iso-propanolamine).

(2) Secondary monoamines such as dialkylamine (e.g. diethylamine), dialkanolamine (e.g. diethanolamine, di-n- or di-iso-propanolamine) and N-alkylalkanolamine (e.g. N-methylethanolamine, N-ethylethanolamine).

(3) Primary or secondary polyamines such as ethylenediamine, diethylenetricamine, hydroxyethylaminoethylamine, ethylaminoethylamine, methylaminoporpylamine, dimethylaminoethylamine and dimethylaminopropylamine.

As examples of the tertiary aminomonoisocyanates, there can be mentioned the followings: teritary monoaminoisocyanates obtained by the reaction of (a) a tertiary aminoalcohol such as 2-(dimethylamino)ethanol, N,N-diisopropylethanolamine, 2-(di-n-butylamino)ethanol, 2-(diethylamino)ethanol, 1-(diethylamino)-2-propanol, 3-(diethylamino)-1-propanol, 3-(dimethylamino)-1-propanol or the like and (b) a polyisocyanate such as hexamethylene diisocyanate, isophorone diisocyanate, hydrogenated diphenylmethane diisocyanate, tolylene diisocyanate, diphenylmethane-4,4'-diisocyanate or the like. The above reaction can be effected preferably in an about equimolar relationship.

Of the above amino group-containing compounds, particularly preferable are monoethanolamine, diethanolamine, diethylenetriamine, hydroxyethylaminoethylamine, N-methylethanolamine an N-ethylethanolamine.

The above primary or secondary amines can be reacted, as they are, with the epoxy group in the lactone-modified epoxy resin or in the addition product between the lactone-modified epoxy resin and the polyphenol compound under conditions such as about 30°-150° C. × about 1-3 hours. However, when a primary amine or a N-hydroxyalkyl secondary amine such as dialkanolamine or N-alkylalkanolamine is used, it is preferable that the amine be firstly reacted with a ketone, an aldehyde or a carboxylic acid at, for example, about 100°–230° C. to convert to a ketimine, a aldimine, an oxazoline or an imidazoline and this reaction product be reacted with the lactone-modified epoxy resin or the addition product between the lactone-modified epoxy resin and the polyphenol compound under conditions such as about 80°–200° C. × about 2–5 hours.

When a tertiary aminomonoisocyanate is used as the amino group-containing compound, it can be reacted with the lactone-modified epoxy resin or the addition product between the resin and the polyphenol compound at a temperature of, for example, about 30°–150° C. until there remains no isocyanate group when measured by the IR absorption spectrum.

The amino group-containing compound is used preferably in such an amount that the final reaction product of the present invention, i.e. the amino group-containing, modified epoxy resin derivative has an amine value of generally 15–100, preferably 30–80, more preferably 35–60. When the amine value is less than 15, it is difficult to disperse the final reaction product in water. When the amine value is more than 100, the coating film of the final reaction product tends to have poor water resistance.

It is preferred that the thus obtained amino group-containing, modified epoxy resin derivative have a weight-average molecular weight of generally about 1,000–8,000, preferably about 1,500–6,000, more preferably about 2,000–5,000.

The amino group-containing, modified epoxy resin derivative can be used in combination with an external crosslinking agent, as necessary. As the external crosslinking agent usable in the present invention, there can be mentioned compounds having at least two crosslinkable groups in the molecule, such as blocked polyisocyanate, α-hydroxycarbamic acid ester of polyamine, malonic acid ester derivative, methylolatedmelamine, methylolated urea, polyepoxy compound, compound containing $\alpha,\beta$-unsaturated double bonds and the like. It is preferable that the compounding ratio (as solid content) of the amino group-containing, modified epoxy resin derivative and the external crosslinking agent be ordinarily 100/0 to 50/50, preferably 90/10 to 60/40 by weight.

It is also possible that the amino group-containing, modified epoxy resin derivative be reacted with a partially-blocked polyisocyanate compound to convert to a self-crosslinkable coating resin composition.

The partially blocked polyisocyanate compound used in the above reaction is a compound which has a blocked ratio of 20–90%, preferably 30–80%, more preferably 40–75% and which can be obtained by reacting a polyisocyanate compound with an isocyanate-blocking agent in such proportions that the ratio of the number of isocyanate groups in polyisocyanate compound/the number of active hydrogen atoms in isocyanate-blocking agent becomes 5/1 to 10/9, preferably 10/3 to 5/4, more preferably 5/2 to 4/3. Herein, the blocking degree refers to a proportion of the number of blocked isocyanate groups to the number of all isocyanate groups originally present in polyisocyanate when the isocyanate groups in said polyisocyanate are reacted with the active hydrogen atoms in blocking agent.

The above reaction can be conducted ordinarily in a solvent-free state or in a solvent inert to the reaction at a temperature of about 10°–15° C. In view of the quality of partially blocked polyisocyanate compound obtained and the controllability of the reaction, it is particularly preferable that the reaction be effected while dropping an isocyanate-blocking agent or its solution in an inert solvent, into a polyisocyanate per se or its solution in an inert solvent, at 20°–110°C.

As the polyisocyanate compound, there can be mentioned, for example, aliphatic or alicyclic polyisocyanate compounds such as hexamethylene diisocyanate, isophorone diisocyanate, hydrogenated diphenylmethane diisocyanate and the like, as well as aromatic polyisocyanate compounds such as tolylene diisocyanate, diphenylmethane-4,4'-diisocyanate and the like. These compounds can be used alone or in combination of two or more.

Of the above polyisocyanate compounds, preferable are aliphatic or alicyclic diisocyanate compounds, particularly hexamethylene diisocyanate and isophorone diisocyanate in view of the weatherability of cured coating film.

The isocyanate-blocking agent adds to the isocyanate group of the polyisocyanate compound and thereby blocks the isocyanate group. The partially blocked polyisocyanate compound formed by the addition is required to be stable at room temperature and, when heated to about 120°–250°C., particularly about 130°200°C., to produce free isocyanate group by liberating the blocking agent. As the blocking agent satisfying such requirements, there can be mentioned, for example, lactam compounds such as ε-caprolactam, γ-butyrolactam and the like; oxime compounds such as methyl ethyl ketoxime, cyclohexanone oxime and the like; phenol compounds such as phenol, para-t-butylphenol, cresol and the like; aliphatic alcohols such as n-butanol, 2-ethylhexanol and the like; aromatic alkyl alcohols such as phenylcarbinol, methylphenylcarbinol and the like; and ether alcohol compounds such as ethylene glycol monobutyl ether and the like.

Of these blocking agents, those of oxime or lactam type are particularly preferable in view of the curability of coating film because they can be liberated at relatively low temperatures.

The reaction of the amino group-containing, modified epoxy resin derivative with the partially blocked polyisocyanate compound can be effected ordinarily at about 50°–150°C., particularly about 60°–120° in a nitrogen current until there remains substantially no isocyanate group. In this reaction, the ratio (weight ratio of solid content) of the amino group-containing, modified epoxy resin derivative and the partially blocked polyisocyanate compound is generally 20/1 to 3/5, preferably 10/1 to 4/5, more preferably 9/1 to 5/5.

The amino group-containing, modified epoxy resin derivative or the reaction product between said resin derivative and the partially blocked polyisocyanate compound can be used as a film-forming component in coating resin compositions. It can be advantageously used in cationic electrocoating resin compositions, in particular.

When the amino group-containing, modified epoxy resin derivative or the reaction product between said resin derivative and the partially blocked polyisocyanate compound is used in a cationic electrocoating resin composition, said resin derivative or said reaction product can be made into an aqueous solution or aqueous dispersion. This aqueous solution or aqueous dispersion can be obtained according to a per se known method. For example, the resin derivative or the reaction product between this resin derivative and the partially blocked polyisocyanate compound is neutralized with at least one of appropriate acids such as inorganic acids (e.g. boric acid, phosphoric acid, sulfuric acid, hydrochloric acid) and organic acids (e.g. lactic acid, acetic acid, formic acid); water is added thereto with thorough stirring; thereby, the neutralization product can be stably dissolved or dispersed in water.

The amount of acid required for neutralization can not be specified strictly. However, in view of electrocoatability, it is preferable that the amount in terms of neutralization number be about 5–40 mg KOH, particularly 10–20 mg KOH per g of resin solid content.

Into the thus prepared aqueous solution or aqueous dispersion can be incorporated as necessary, by kneading, colored pigments such as carbon black, titanium white, red iron oxide and the like; fillers such as clay, talc and the like; rust-preventive pigments such as strontium chromate, lead chromate and the like; and other additives. As other additives, there can be mentioned, for example, nonionic surfactants as a dispersant or as an agent for prevention of cissing on coating surface; curing accelerators (e.g. salts of metals such as lead, bismuth, tin, zinc, iron, aluminum and the like, and/or imidazoline compounds, imidazoles, phosphines, quaternary phosphonium salts); and water-miscible organic solvents (e.g. ethylene glycol monobutyl ether, ethylene glycol monoethyl ether, methoxypropanol, diethylene glycol monoethyl ether, ethylene glycol monohexyl ether, ethylene glycol 2-ethylhexyl ether, benzyl alcohol, octyl alcohol).

The above prepared aqueous solution or aqueous dispersion can be applied to electrocoating using a method and apparatus per se known conventionally in electrocoating. In this case, it is desirable that an article to be coated be used as a cathode and a stainless steel or carbon plate be used as an anode. The electrocoating conditions have no particular restrictions. However, desirably the electrocoating is effected generally under conditions of 20°–30° C. (bath temperature), 100–400 V, preferably 200–300 V, 0.01–3 A/dm$^2$ (current density), 1–5 minutes (time of voltage application), 2/1 to ½ (areal ratio of anode and cathode) and 10–100 cm (cathode-to-anode distance) with stirring.

The coating film formed on the cathode (the article to be coated) is washed and then cured by baking ordinarily at about 120°–200°C., preferably about 130°–180° C. for about 10–60 minutes, whereby a cured coating film with excellent film properties can be obtained.

The coating resin composition, particularly the cationic electrocoating resin composition of the present invention having the above mentioned constitution has high-build coatability and is superior in weatherability, corrosion resistance, and flexibility because it contains in the molecule a methylene side chain with a primary hydroxyl group formed by the reaction of a hydroxyl group-containing epoxy resin and a cyclic ester compound. Further, said resin composition is superior in water resistance, secondary adhesion and corrosion resistance because it contains a secondary hydroxyl group formed by the reaction of (a) a lactone-modified epoxy resin or its addition product with an amino group-containing compound with (b) a polyphenol compound and being effective for adhesion to metal substrates. Accordingly, said resin composition can be widely used in fields such as primer coating for automotive body and coating for industrial parts and household electric appliances.

The present invention is described more specifically below by way of Examples.

In the Examples, parts and % refer to parts by weight and % by weight, respectively.

PRODUCTION EXAMPLE 1

Production of Amino Group-Containing, Modified Epoxy Resin Derivative

Into a flask equipped with a stirrer, a thermometer, a nitrogen-blowing tube and a reflux condenser was fed 518 parts of an epoxy resin having a number-average molecular weight of 370 and an epoxy equivalent of 185 obtained by the reaction of bisphenol A and epichlorohydrin. Thereto were added 57 parts of bisphenol A and 0.2 part of dimethylbenzylamine, and the mixture was reacted at 120° C. until an epoxy equivalent of 250 was obtained. Then, 213 parts of $\epsilon$-caprolactone and 0.03 part of tetrabutoxytitanium and the resulting mixture was heated to 170°C. With this temperature being kept, sampling was conducted with the lapse of time to trace the amount of unreacted $\epsilon$-caprolactone by the measurement of the IR absorption spectrum. When the conversion of raw materials became 98% or higher, 148 parts of bisphenol A and 0.4 part of dimethylbenzylamine were further added and the resulting mixture was reacted at 130° C. until an epoxy equivalent of 936 was obtained. Then, 257.4 parts of methyl isobutyl ketone, 25.6 parts of diethylamine and 68.3 parts of diethanolamine were added and the resulting mixture was reacted at 80° C. for 2 hours. The reaction mixture was diluted with 143.4 parts of ethylene glycol monobutyl ether to obtain an amino group-containing, modified epoxy resin derivative having a resin solid content of 72% and an amine value (of resin solid content) of 54.5.

PRODUCTION EXAMPLE 2

Production of Amino Group-Containing, Modified Epoxy Resin Derivative

Into a flask equipped with a stirrer, a thermometer, a nitrogen-blowing tube and a reflux condenser were fed 518 parts of an epoxy resin having a number-average molecular weight of 370 and an epoxy equivalent of 185 obtained by the reaction of bisphenol A and epichlorohydrin. Thereto were added 57 parts of bisphenol A and 0.2 part of dimethylbenzylamine, and the mixture was reacted until an epoxy equivalent of 250 was obtained. 270 parts of $\epsilon$-caprolactone and 0.03 part of tetrabutoxytitanium were added and the mixture was heated to 170°C. With this temperature being kept, sampling was conducted with the lapse of time to trace the amount of unreacted $\epsilon$-caprolactone by the measurement of the IR absorption spectrum. When the conversion of raw materials became 98% or higher, 148 parts of bisphenol A and 0.4 part of dimethylbenzylamine were further added and the mixture was reacted at 130° C. until an epoxy equivalent of 993 was obtained. Thereto was added 138 parts of a methyl isobutyl ketone solution of a ketimine between monoethanolamine and methyl isobutyl ketone (the amount of effective component in solution=80%), and the mixture was reacted at 140° C. until an epoxy equivalent (of resin solid content) of 4797 was obtained. The reaction mixture was diluted with 248 parts of ethylene glycol monobutyl ether and, when the temperature became 100°C., there was added 50 parts of a methyl isobutyl ketone solution of a ketimine between diethylenetriamine and methyl isobutyl ketone (the amount of effective component in solution=80%). The mixture was reacted at 100° C. until there remained no epoxy group, to obtain an amino group-containing, modified epoxy resin derivative having a resin solid content of 80% and an amine value (of resin solid content) of 52.5.

PRODUCTION EXAMPLE 3

Production of Amino Group-Containing, Modified Epoxy Resin Derivative for Comparative Example 1

Into the same reactor as used in Production Example 1 were fed, with nitrogen gas being blown in, 476 parts of a polypropylene glycol diglycidyl ether having an epoxy equivalent of about 317, 342 parts of bisphenol A and 36 parts of a methyl isobutyl ketone solution of a ketimine between monoethanolamine and methyl isobutyl ketone (the amount of effective component in solution=80%). The mixture was reacted at 160° C. until there remained no epoxy group.

Thereto were added 665 parts of bisphenol A diglycidyl ether having an epoxy equivalent of about 190 and 232 parts of a methyl isobutyl ketone solution of a kitimine between monoethanolamine and methyl isobutyl ketone (the amount of effective component in solution=80%). The mixture was reacted at 140° C. until an epoxy equivalent (of resin solid content) of 3555 was obtained. The resulting mixture was diluted with 365 parts of ethylene glycol monobutyl ether. When the temperature came down to 100°C., there was added 100 parts of a methyl isobutyl ketone solution of a diketimine between diethylenetriamine and methyl isobutyl ketone (the amount of effective component in solution=80%). The mixture was reacted at 100° C. until there remained no epoxy group, to obtain an amino group-containing epoxy resin derivative having a resin solid content of 80% and an amine value (of resin solid content) of 66.3.

PRODUCTION EXAMPLE 4

Production of Amino Group-Containing, Modified Epoxy Resin Derivative for Comparative Example 2

Into the same reactor as used in Production Example 1 were fed, with nitrogen gas being blown in, 1,110 parts of an epoxy resin having a number-average molecular weight of 370 and an epoxy equivalent of 185 obtained by the reaction of bisphenol A and epichlorohydrin, 495 parts of a polycaprolactonediol having a molecular weight of 550 [PLACCEL 205, product of Daicel Chemical Industries, Ltd.] and 3.02 parts of dimethylbenzylamine. The mixture was reacted at 150° C. until an epoxy equivalent of 383 was obtained. Then, 251 parts of bisphenol A was added and the resulting mixture was reacted at 120° C. until an epoxy equivalent of 928 was obtained. Thereafter, there was added 227 parts of a methyl isobutyl ketone solution of a ketimine between monoethanolamine and methyl isobutyl ketone (the amount of effective component in solution=80%), and the mixture was reacted at 120° C. until an epoxy equivalent (of resin solid content) of 4617 was obtained. The reaction mixture was diluted with 464 parts of ethylene glycol monobutyl ether. When the temperature came down to 100°C., there was added 100 parts of a methyl isobutyl ketone solution of a ketimine between diethylenetriamine and methyl isobutyl ketone (the amount of effective component in solution=80%), and the mixture was reacted at 100° C. until there remained no epoxy group, to obtain an amino group-containing epoxy resin derivative having a resin solid content of 80% and an amine value (of resin solid content) of 55.9.

EXAMPLES 1-2 AND COMPARATIVE EXAMPLES 1-2

Each of the four resin solutions obtained in the above Productive Examples was mixed with methyl ethyl etoxime-blocked isophorone diisocyanate so that the blocked isocyanate group became equivalent to the total amount of the primary hydroxyl group and the primary amino group both present in the epoxy-polyamine resin.

To 100 parts by weight (as solid content) of each of the resulting resin compositions were added 1 part of a polypropylene glycol (SANNIX PP 4000, product of Sanyo Chemical Industries, Ltd.), 0.96 part of acetic acid and 1 part of lead acetate. The mixture was heated to 60° C. and deionized water was slowly added with stirring to disperse the mixture in water to obtain an emulsion of good stability having a resin solid content of 30%.

To 100 parts by weight (as resin solid content) of each of the emulsions were added 3 parts of basic lead silicate, 13 parts of titanium white, 0.3 part of carbon black, 3 parts of clay, 2 parts of dibutyltin oxide and 1 part of a nonionic surfactant (Noigen 142 B, product of Daiichi Kogyo Seiyaku Co., Ltd.). The mixture was treated in a ball mill to disperse the pigments until particle sizes of 10 μm of below were obtained. The resulting dispersion was further diluted with deionized water until the resin solid content became 15%.

Using each of the four dilute paints obtained above, there was conducted the cationic electrocoating of an untreated steel plate of a Bt-3080 (zinc phosphate) -treated steel plate for 3 minutes at a bath temperature of 28° C. at 250 V. Each of the electrocoated plates was subjected to baking for 20 minutes at 160° C. and then tested for corrosion resistance.

The resin composition and the test results are shown in Table 1.

TABLE 1

| | Examples | | Comparative Examples | |
|---|---|---|---|---|
| | 1 | 2 | 1 | 2 |
| Resin compounding | | | | |
| Basic resin | | | | |
| Type (No. of Production Example) | 1 | 2 | 3 | 4 |
| Solid content (parts) | 74 | 79 | 81 | 83 |
| Methyl ethyl ketoxime - blocked isophorone diisocyanate, solid content (parts) | 26 | 21 | 19 | 17 |
| Film thickness[1] (μm) | 43 | 48 | 45 | 21 |
| Condition of coating film surface | ○ | ○ | ○ | ○ |
| Corrosion resistance | | | | |
| Untreated steel plate | | | | |
| Resistance to salt spray[2], 480 hr (mm) | 1.2 | 1.9 | 4.5 | 4 |

TABLE 1-continued

|  | Examples | | Comparative Examples | |
|---|---|---|---|---|
|  | 1 | 2 | 1 | 2 |
| Resistance to salt water immersion*3, 480 hr BT-3080-treated steel plate | ○ | ○ | X | Δ |
| Resistance to salt spray*2, | | | | |
| 1,000 hr (mm) | <1 | <1 | 5-6 | 4-5 |
| 1,500 hr (mm) | 1-2 | 1-2 | — | — |
| Resistance to salt water immersion*3, 800 hr | ⊙ | ⊙ | Δ | ⦶ |

In table 1, each *-marked test item denotes the following.

*1 Film thickness

A thickness of an electrocoating film formed when electrocoating was effected using an untreated steel plate as cathode at 250 V for 3 minutes.

*2 Resistance to salt spray

On an electrocoating film formed on a substrate were made cross cuts with a knife so that the cuts reached the substrate. Then, the substrate having crosscut film was subjected to a test specified by JIS Z 2371 to measure the width of the rust and blister developed from the cross cuts. The test time was 480 hours for untreated steel plates and 1,000 and 1,500 hours for Bt-3080-treated steel plates.

*3 Resistance to salt water immersion

A plate with an electrocoating film was immersed in a 5% aqueous NaCl solution, and the change in the flat portion of the plate was observed. The immersion time was 480 hours for untreated steel plates and 800 hours for Bt-3080-treated steel plates.

The following rating criterion was used.

⊙: Substantially no change.

○: A change is seen on the electrocoating film but the total of the blister and peeling is less than 5%.

⦶ : The total of the blister and peeling is 5% to less than 10%.

Δ: The total of the blister and peeling is 10% to less than 50%.

X: The total of the blister and peeling is 50% and more.

PRODUCTION EXAMPLE 5

Production of Amino Group-Containing, Modified Epoxy Resin

Into the same flask as used in Production Example 1 were fed 500 parts of an epoxy resin having a number-average molecular weight of 370 and an epoxy equivalent of 185 obtained by the reaction of bisphenol A and epichlorohydrin and 59.3 parts of bisphenol A. Thereto was added 0.2 part of dimethylbenzylamine. The mixture was reacted at 130° C. until an epoxy equivalent of 256 was obtained. Then, 145.5 parts of ε-caprolactone and 0.08 part of tetrabutoxytitanium were added. The mixture was heated to 170°C. While keeping this temperature, sampling was conducted with the lapse of time to trace the amount of unreacted ε-caprolactone by the measurement of the IR absorption spectrum. When the conversion of raw materials reached 98% or higher, there were added 134.9 parts of methyl isobutyl ketone, 67.5 parts of N-methylethanolamine and 36.4 parts of diethanolamine, and the resulting mixture was reacted for 2 hours at 80°C. Then, 490.2 parts of bisphenol A was added and the mixture was reacted at 120° C. until there remained no epoxy resin. The reaction mixture was diluted with 176.5 parts of methyl ethyl ketone to obtain an amino group-containing, modified epoxy resin having a resin solid content of 75% and an amine value of 39.5.

PRODUCTION EXAMPLE 6

Production of Partially Blocked Polyisocyanate 222 parts of isophorone diisocyanate was fed into a reactor. Thereinto was slowly dropped 113.1 parts of methyl ethyl ketoxime with keeping the system temperature at 3°-40° C. by external cooling to synthesize a partially blocked polyisocyanate.

PRODUCTION EXAMPLE 7

Production of Partially Blocked Polyisocyanate 200 parts of hexamethylene diisocyanate was fed into a reactor. Thereinto was slowly dropped 155 parts of methyl ethyl ketoxime with keeping the system temperature at 30°-40° C. by external cooling to synthesize a partially blocked polyisocyanate.

PRODUCTION EXAMPLE 8

Production of Partially Blocked Polyisocyanate 200 parts of tolylene diisocyanate was fed into a reactor. Thereinto was slowly dropped 169 parts of 2-ethyl-hexanol with controlling the system temperature at 80°-100° C. by cooling to synthesize a partially blocked polyisocyanate.

PRODUCTION EXAMPLE 9

Production of Amino Group-Containing Epoxy Resin for Comparative Example 3

Into the same flask as used in Production Example 1 was fed 600 parts of an epoxy resin having a number-average molecular weight of 370 and an epoxy equivalent of 185 obtained by the reaction of bisphenol A and epichlorohydrin. Thereto were added 237.5 parts of bisphenol A and 0.93 part of dimethylbenzylamine. The mixture was reacted at 120° C. in a nitrogen current until an epoxy equivalent of 723 was obtained. Thereto were added 246.7 parts of ε-caprolactone and 0.05 part of tetrabutoxytitanium. The mixture was heated to 170°C. While keeping this temperature, sampling was conducted with the lapse of time to trace the amount of unreacted ε-caprolactone by the measurement of the IR absorption spectrum. When the conversion of raw materials reached 98% or higher, there were added 298.1 parts of methyl isobutyl ketone, 29.7 parts by weight of diethylamine and 79.1 parts of diethanolamine. The mixture was reacted for 2 hours at 80° C. The reaction mixture was diluted with 166.1 parts of methyl ethyl ketone to obtain a product having a solid content of 72% and an amine value of 54.6.

PRODUCTION EXAMPLE 10

Production of Amino Group-Containing Epoxy Resin for Comparative Example 4

Into the same flask as used in Production Example 1 were fed 1,378.5 parts of an epoxy resin having a number-average molecular weight of 370 and an epoxy equivalent of 185 obtained by the reaction of bisphenol A and epichlorohydrin and 621.5 parts of bisphenol A. Thereto was added 546.9 parts of methyl isobutyl ketone. After the mixture was made into a solution by heating, 2.2 parts of dimethylbenzylamine was added. The resulting mixture was reacted at 120° C. until an epoxy equivalent of 1,000 was obtained. Then, 51.1 parts of diethylamine and 136.5 parts of diethanolamine were added and the mixture was reacted for 2 hours at 80°C. The reaction mixture was diluted with 303.8 parts of methyl ethyl ketone to obtain a product having a solid content of 72% and an amine value of 51.3.

EXAMPLE 3

83.7 parts of the partially blocked isocyanate obtained in Production Example 6 was added to 500 parts of the amino group-containing, modified epoxy resin obtained in Production Example 1. The mixture was reacted at 100° C. in a nitrogen current until there remained no isocyanate group by the measurement of the IR absorption spectrum. The reaction mixture was diluted with 143.1 parts of diethylene glycol monobutyl ether to obtain a resin composition for cationic electrocoating paint having a solid content of 70% and an amine value (of resin solid content) of 44.2.

EXAMPLES 4–6 AND COMPARATIVE EXAMPLES 3–4

An amino group-containing, modified epoxy resin and a partially blocked isocyanate both shown in Table 2 were reacted in proportions shown in Table 2, in the same manner as in Example 3. The reaction mixture was diluted with diethylene glycol monobutyl ether so that the solid content after dilution became 70%, whereby resin compositions for cationic electrocoating paint of Examples 4–6 and Comparative Examples 3–4 were obtained. The amine values (of resin solid content) of these compositions are shown in Table 2.

TABLE 2

|  | Examples | | | | Comparative Examples | |
|---|---|---|---|---|---|---|
|  | 3 | 4 | 5 | 6 | 3 | 4 |
| Materials | | | | | | |
| Amino group-containing modified epoxy resin | | | | | | |
| No. of Production Example | 1 | 1 | 1 | 5 | 9 | 10 |
| Parts | 500 | 500 | 500 | 480 | 500 | 500 |
| Partially blocked polyisocyanate | | | | | | |
| No. of Production Example | 6 | 7 | 8 | 6 | 6 | 6 |
| Parts | 83.6 | 83.6 | 87.5 | 45.4 | 83.6 | 91.1 |
| Resin composition for cationic electropaint | | | | | | |
| Amine value (of resin solid content) | 44.2 | 44.2 | 43.8 | 35.1 | 44.3 | 40.9 |
| Solid content (%) | 70 | 70 | 70 | 70 | 70 | 70 |

APPLICATION EXAMPLE 1

57.1 parts of the resin composition for cationic electrocoating paint obtained in Example 3 was neutralized with 1.1 parts of glacial acetic acid. Thereto was added 41.8 parts of deionized water to disperse the resin composition in water to obtain a resin emulsion (I) having a solid content of about 40%.

An electrocoating paint having the following formulation was electrocoated on a zinc phosphate-treated cold-rolled steel plate having a thickness of 0.8 mm so that the coating film had a thickness of 20 μm. After water washing, the coated steel plate was baked at 180° C. for 30 minutes. The resulting coated plate (test plate) was tested for properties of coating film. The results are shown in Table 4.

| Component | Amount (parts) |
|---|---|
| Resin emulsion (I) | 100 |
| Titanium white | 10 |
| Basic lead silicate | 2 |
| Carbon black | 0.3 |
| Dibutyltin oxide | 2 |
| Deionized water | 207 |

APPLICATION EXAMPLES 2–4 AND COMPARATIVE APPLICATION EXAMPLES 1–2

Electrocoating paints and coated plates of Application Examples 2–4 and Comparative Application Examples 1–2 were obtained in the same manner as in Application Example 1 except that there were used the resin compositions for cationic electrocoating paint as shown in Table 3. The test results of the coated plates are shown in Table 4.

TABLE 3

|  | Application Examples | | | | Comparative Application Examples | |
|---|---|---|---|---|---|---|
|  | 1 | 2 | 3 | 4 | 1 | 2 |
| Resin composition for electrocoating paint (No. of Example or Comparative Example) | Example 3 | Example 4 | Example 5 | Example 6 | Comparative Example 3 | Comparative Example 4 |

TABLE 4

| Test item | Test method | Examples 3 | Examples 4 | Examples 5 | Examples 6 | Comparative Examples 3 | Comparative Examples 4 |
|---|---|---|---|---|---|---|---|
| Properties of coating film | | | | | | | |
| Appearance | Visual check | ○ | ○ | ○ | ○ | ○ | Δ** |
| Adhesion | Cross cuts-peeling test by cellophane adhesive tape | 100/100 | 100/100 | 100/100 | 100/100 | 100/100 | 100/100 |
| Impact resistance*1 | Du Pont impact tester, 500 g, ½ in. (cm)*1 | >50 | >50 | >50 | >50 | >50 | 40 |
| Flexibility*2 | Bending test (10 mmφ)*2 | ○ | ○ | ○ | ○ | ○ | X |
| Secondary adhesion | Adhesion after immersion in hot water of 40° C. for 10 days | 100/100 | 100/100 | 100/100 | 100/100 | 70/100 | 50/100 |
| Corrosion resistance*3 | Width of cross cut portions peeled when the cross cut portions have been peeled by a cellophane tape after 480 hours of a salt spray test (mm)*3 | 0.9 | 1.2 | 0.7 | 0.5 | 4.2 | Above 5 |
| weatherability*4 | Time of peeling in two-coat clear system (hr)*4 | 320 | 320 | 160 | 340 | 190 | 40 |
| Overall rating | weatherability | ⊚ | ⊚ | ⊛ | ⊚ | ⊛ | X |
| | Corrosion resistance | ○ | ○ | ○ | ○ | Δ | X |

**Formation of pin holes

In Table 4, each *-marked test item was tested as follows.

*1 Impact resistance

A test plate with a coating film was placed in a constant temperature-constant humidity chamber of 20±1° C. and 75±2% for 24 hours. Then, a Du Pont impact tester was provided with impact tool which has a fixed roundness at its tip, a ring-shaped anvil which matches to that roundness and an apparatus which drops the weight from the fixed height; the test plate was placed between the anvil and the impact tool with the coating film directed upward; and a given weight was dropped on the impact tool to measure the maximum height at which the impact of the dropping gave neither cracking nor peeling of coating film.

*2 Flexibility

A test plate with a coating film was placed in a constant temperature-constant humidity chamber of 20±1° C. and 75±2% for 24 hours and then bent around a rod having a defined diameter with the coating film directed outside by 180° C. in 1-2 seconds. The case giving no damage on the both surfaces at the bent portion was rated as ○, and the case giving damage such as cracking and peeling on at least either of the both surfaces at the bent portion was rated as X.

*3 Corrosion resistance

On a plate with a coating film was made cross cuts. Then, the plate was subjected to a test specified by JIS Z 2371 for 480 hours. The cross cut portions were subjected to a cellophane adhesive tape peeling test and the width of peeling was measured.

*4 Weatherability

On a test plate with a cured electrodeposition coating film was coated an aminoalkyd clear paint at a thickness of 35 μm followed by baking at 140° C. for 15 minutes. The resulting coated plate was placed in a sunshine weatherometer for 20 hours and then immersed in water at 40° C. for 20 hours. Thereafter, cross cuts were made on the plate, and the plate was subjected to a peeling test with a cellophane adhesive tape. This procedure as one cycle was repeated and there was recorded a total time for which the plate was placed in the sunshine weatherometer without causing any peeling.

What we claim is:

1. A coating resin composition comprising, an amino group-containing, lactone-modified epoxy resin derivative having secondary hydroxyl groups and an amine value of 15 to 100 obtained by
   (i) subjecting
     (A) a hydroxyl group-containing epoxy resin having an epoxy equivalent of 200 to 400, and
     (B) a cyclic ester compound represented by the general formula

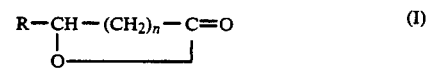

wherein R is a hydrogen atom or a methyl group, n is an integer of 3 to 6
   to an addition reaction to obtain a lactone-modified epoxy resin; and then
   (ii) reacting the lactone-modified epoxy resin with
     (C) a polyphenol compound and
     (D) an amino group-containing compound,
   wherein the amount of the polyphenol compound (C) is 0.2 to 0.9 mole per mole of the lactone-modified epoxy resin or per mole of the addition product having epoxy groups between the lactone-modified epoxy resin and the amino group-containing compound.

2. A composition according to claim 1, wherein the epoxy equivalent of the hydroxyl group-containing epoxy resins is 220-350.

3. A composition according to claim 1, wherein the hydroxyl group-containing epoxy resins has hydroxyl groups of at least 0.5, to less than 2 per molecule, on an average.

4. A composition according to claim 1, wherein the hydroxyl group-containing epoxy resins has 2 epoxy groups per molecule.

5. A composition according to claim 1, wherein the hydroxyl group-containing epoxy resins is a glycidyl ether of a polyphenol or a polymer thereof.

6. A composition according to claim 1, wherein the cyclic ester compound (B) is selected from δ-valerolactone, ε-caprolactone, ζ-enantholactone, η-caprylolactone, γ-valerolactone, δ-caprolactone, ε-enantholactone and ζ-caprylolactone.

7. A composition according to claim 1, wherein the cyclic ester compound (B) is a lactone of the formula (I) in which R is a hydrogen atom and n is 4–6.

8. A composition according to claim 1, wherein the amino group-containing, lactone-modified epoxy resin derivative contains a component derived from the cyclic ester compound in an amount of 5–50% by weight.

9. A composition according to claim 1, wherein the polyphenol compound (C) is selected from bis(4-hydroxyphenyl)-2,2-propane, bis(4-hydroxyphenyl)-1,1-ethane, bis(4-hydroxyphenyl)-1,1-isobutane, 4,4'-dihydroxybenzophenone, bis(4-hydroxy-3-t-butylphenyl)-2,2-propane, bis(2-hydroxynaphthyl)methane and 1,5-dihydroxynaphthalene.

10. A composition according to claim 1, wherein the amino group-containing compound (D) is selected from aliphatic, alicyclic or aromatic-aliphatic primary or secondary amines and tertiary aminomonoisocyanates.

11. A composition according to claim 1, wherein the amino group-containing compound (D) is selected from monoethanolamine, diethanolamine, diethylenetriamine and hydroxyethylaminoethylamine.

12. A composition according to claim 1, wherein the amino group-containing, modified epoxy resin derivative has an amine value of 30–80.

13. A composition according to claim 1, wherein the amine group-containing, modified epoxy resin derivative has a weight-average molecular weight of about 1,000 to about 8,000.

14. A coated article obtained by coating an article with the composition of claim 1.

15. A composition according to claim 1, wherein the amount of the polyphenol compound (C) is 0.35 to 0.80 mole per mole of the lactone-modified epoxy resin or per mole of the addition product having epoxy groups between the lactone-modified epoxy resin and the amino group-containing compound.

16. A composition according to claim 1, wherein the amino group-containing, lactone-modified epoxy resin derivative is obtained by first reacting the lactone-modified epoxy resin with the polyphenol compound (C) in an amount of 0.2 to 0.9 mole of the polyphenol compound (C) per mole of the lactone-modified epoxy resin, and then reacting the addition product between the lactone-modified epoxy resin and the polyphenol compound (C) with the amino group-containing compound (D).

* * * * *